US007739205B1

(12) United States Patent
Reisinger

(10) Patent No.: US 7,739,205 B1
(45) Date of Patent: Jun. 15, 2010

(54) ARRANGEMENT FOR LOADING RATE TABLES

(75) Inventor: Frank Reisinger, Oranienburg (DE)

(73) Assignee: Francotyp-Postalia AG & Co. (DE)

( * ) Notice: Subject to any disclaimer, the term of this patent is extended or adjusted under 35 U.S.C. 154(b) by 2521 days.

(21) Appl. No.: 09/586,480

(22) Filed: Jun. 1, 2000

(30) Foreign Application Priority Data

Jun. 2, 1999 (DE) ................................ 199 25 381

(51) Int. Cl.
*G06F 17/00* (2006.01)

(52) U.S. Cl. ...................................................... 705/409

(58) Field of Classification Search ................. 705/407, 705/410, 408, 401, 403, 402, 409, 404, 405; 177/25.15, 25.13; 235/101, 375
See application file for complete search history.

(56) References Cited

U.S. PATENT DOCUMENTS

| | | | | | |
|---|---|---|---|---|---|
| 3,692,988 | A | * | 9/1972 | Dlugos et al. | 235/151.33 |
| 4,122,532 | A | * | 10/1978 | Dlugos et al. | 364/900 |
| 4,138,735 | A | * | 2/1979 | Allocca et al. | 364/900 |
| 4,410,961 | A | * | 10/1983 | Dlugos et al. | 710/4 |
| 4,485,439 | A | * | 11/1984 | Rothstein | 710/63 |
| 4,495,581 | A | * | 1/1985 | Piccione | 364/466 |
| 4,512,432 | A | * | 4/1985 | Balenger | 177/211 |
| 4,597,457 | A | * | 7/1986 | Ikekita | 177/25 |
| 4,606,003 | A | * | 8/1986 | Daniels | 711/2 |
| 4,638,439 | A | * | 1/1987 | Daniels | 364/446 |
| 4,649,490 | A | * | 3/1987 | Manduley et al. | 705/407 |
| 4,787,045 | A | * | 11/1988 | Storace et al. | 705/403 |
| 4,787,046 | A | * | 11/1988 | Feinland et al. | 364/464.03 |
| 4,868,757 | A | * | 9/1989 | Gil | 705/406 |
| 4,901,237 | A | * | 2/1990 | Hikita et al. | 364/464.01 |
| 5,069,299 | A | * | 12/1991 | Haroutel | 177/25.15 |
| 5,406,036 | A | * | 4/1995 | Haug | 177/25.15 |
| 5,414,817 | A | * | 5/1995 | Ezzet et al. | 710/17 |
| 5,422,520 | A | * | 6/1995 | Shimizu et al. | 307/116 |
| 5,448,641 | A | | 9/1995 | Pintsov et al. | |
| 5,490,077 | A | | 2/1996 | Freytag | |
| 5,538,234 | A | * | 7/1996 | Yankloski | 271/11 |
| 5,606,507 | A | * | 2/1997 | Kara | 364/464.18 |
| 5,606,508 | A | | 2/1997 | Thiel | |
| 5,615,120 | A | * | 3/1997 | Schwartz et al. | 364/464.17 |
| 5,625,678 | A | * | 4/1997 | Blomfield-Brown | 379/93.08 |
| 5,710,706 | A | * | 1/1998 | Markl et al. | 705/409 |

(Continued)

FOREIGN PATENT DOCUMENTS

| | | |
|---|---|---|
| CA | 2118281 | 4/1995 |

(Continued)

OTHER PUBLICATIONS

RS Sep. 1998-Feb. 1999 Catalog, p. 2-1472 (Serial Switching Box).

*Primary Examiner*—Igor Borissov
(74) *Attorney, Agent, or Firm*—Schiff Hardin LLP

(57) ABSTRACT

An arrangement for loading rate tables has a switchover module that is connected between a meter of a postage meter machine and a modem, between a postage calculator of an external scale and the modem. A control line drives the switchover module, so that the modem and the postage calculator can be functionally directly connected to one another for the purpose of loading rate tables.

14 Claims, 3 Drawing Sheets

U.S. PATENT DOCUMENTS

| | | | | |
|---|---|---|---|---|
| 5,710,721 | A | 1/1998 | Rieckhoff et al. | |
| 5,717,596 | A * | 2/1998 | Bernard et al. | 705/404 |
| 5,724,245 | A * | 3/1998 | Maher et al. | 364/464.18 |
| 5,737,426 | A * | 4/1998 | Brookner et al. | 380/51 |
| 5,754,881 | A * | 5/1998 | Aas | 710/2 |
| 5,778,348 | A * | 7/1998 | Manduley et al. | 705/409 |
| 5,963,650 | A * | 10/1999 | Simionescu et al. | 705/63 |
| 6,041,319 | A * | 3/2000 | Bass et al. | 705/409 |
| 6,157,919 | A * | 12/2000 | Cordery et al. | 705/60 |
| 6,226,626 | B1 * | 5/2001 | Thiel | 705/407 |
| 6,298,337 | B1 * | 10/2001 | Kubatzki et al. | 705/410 |
| 6,314,297 | B1 * | 11/2001 | Karl | 455/456.3 |
| 6,359,894 | B1 * | 3/2002 | Hong et al. | 370/402 |
| 6,381,236 | B1 * | 4/2002 | Miyashita et al. | 370/343 |
| 6,392,173 | B1 * | 5/2002 | Hirano et al. | 200/245 |
| 2001/0043166 | A1 * | 11/2001 | Jacobsen et al. | 345/27 |

FOREIGN PATENT DOCUMENTS

| | | | |
|---|---|---|---|
| DE | PS 38 23 719 | | 1/1989 |
| DE | OS 44 16 879 | | 11/1995 |
| DE | EP0 805 419 | A2 * | 5/1997 |
| EP | 0 717 539 | | 6/1996 |
| EP | 000717376 | A2 * | 6/1996 |
| EP | 0 775 984 | | 5/1997 |
| GB | 2227453 | A * | 8/1990 |

* cited by examiner

ARRANGEMENT FOR LOADING RATE TABLES

BACKGROUND OF THE INVENTION

1. Field of the Invention

The present invention is directed to an arrangement for loading rate tables of a type suitable for use in postage meter machines and postage-calculating scales.

2. Description of the Prior Art

German PS 38 23 719 and U.S. Pat. No. 4,138,735 disclose initiating reloading of a rate table for postage fees at specific points in time from a remote data center. When the data exchange is initiated by the server of the data center, the postage meter machine must always remain on, which, of course, is disadvantageous.

Alternatively, U.S. Pat. Nos. 5,490,077 and 5,606,508 disclose initiating the data loading on demand by the postage meter machine, whereby the database is updated dependent on conditions (such as, for example, name, date) after the postage meter machine is turned on. In order to provide the majority of postal customers with an up-to-date rate table in time, the new table is stored in a memory of a transmission medium (chip card or cell of a GSM network) separately from the postage meter machine long before it takes effect. When the postage meter machine is turned on, the date of the calendar module of the postage meter machine is employed or is operated with further conditions that have been entered, in order to select the table that is loaded into the memory of the postage meter machine when it is initialized. An updating of the previous table ensues when loading from a memory of the transmission medium into the memory of the postage meter machine.

U.S. Pat. No. 5,710,706 (European Application 724 141) discloses making a data input into a scale that is connected by interface to a postage meter machine in order to update rate table data with data. The loading of the data ensues by modem to the postage meter machine from a remote data center. The loading and updating ensue immediately following one another. When information is present that rate table data are to be updated, a loading ensues and, if necessary, the rate table data are intermediately stored in the postage meter machine and a sector-by-sector deleting of the old postage table in the non-volatile memory of the scale before the transmission of the new rate table data from the intermediate memory of the postage meter machine to the scale, and the new rate table data are written into the non-volatile memory of the scale. A number of tables can be stored in the scale. Each table, however, refers to a separate mail carrier that can be selected by a keyboard. The minimum validity date of a rate table allocated to a carrier identification number CIN is stored and is interpreted by the postage meter machine in order to form request data as needed for loading new rate table data, or for updating in the memory of the scale according to the CIN. When, however, the minimum validity data is simultaneously the conversion date from an old to a new rate table, then a backlog occurs in the communication with the data center when a large number of postage meter machines wish to communicate with this data center on the same day.

U.S. Pat. No. 5,448,641 discloses a postal fee system with validity check in the terminal equipment at the user side. The postage rate table is transmitted from the data center to the terminal equipment. A code belonging to the postage rate table is also transmitted from the data center to the terminal equipment. The terminal equipment generates a comparison code from an information based on the received postage rate table. The validity of the received postage rate table can be checked in the terminal equipment on the basis of the comparison of the received code to the generated comparison code. The terminal equipment thus can verify the communicated postage rate table. An extremely large number of modems would have to be employed for reducing the backlog in the communication with the data center when a number of postage meter machines wish to communicate with this data center on the same day, which increases the outlay at the data center. Communication problems also arise due to the backlog. These lead to a lengthening of the conversion process to a new postage rate table for a number of devices. The user cannot operate the affected device for mail processing during this time.

In the aforementioned U.S. Pat. No. 5,710,706, the scale uses the modem of the postage meter machine for loading rate tables. The time of the loading is determined by the postage meter machine, which interprets the date data. In German Application 198 43 252.6-53, the loading is triggered by the device that contains the postage calculator. When a postage-calculating scale is connected to a postage meter machine that contains a modem, the load data are passed through the I/O controller of the postage meter machine. As a result, the loading rate is low.

SUMMARY OF THE INVENTION

An object of the present invention is to provide an arrangement that can significantly increase the speed of the data communication to the postage-calculating scale when reloading postage rate tables. The procedure of supplying all postage calculators with a new postage rate table should be shortened at the data center without, however, thereby increasing the outlay in the data center. The postage rate table of an arbitrary carrier should be loadable into the corresponding memories of the scale on demand.

This object is achieved in an arrangement of a controlled switchover module externally of or within a postage meter machine that has an interface to at least one modem and, as warranted to a postage-calculating scale, whereby a postage calculator of the scale drives the switchover circuit such that the modem and postage calculator are functionally directly connected to one another for the purpose of loading rate tables.

The postage meter machine is, for example, a type T1000C and the postage-calculating scale is, for example, a type MS 3000 (both commercially available from Francotyp-Postalia AG and Co. An interface of the postage meter machine to the modem serves for a reloading of credit and is connected to the controlled switchover module via four lines for this purpose. A relay having a corresponding number of switchover contacts or a number of relays can be employed for the switching. If the number of switchover contacts is inadequate given a commercially available relay type, further relays are utilized. It is advantageous when the relays are realized with field effect transistors or other electronic switches. The arrangement of the switchover module increases the load rate for the postage calculator.

An advantage of the invention is that the reload data no longer need run through a control circuit of the postage meter machine, which proves to be a bottleneck, but can proceed directly to the postage-calculating scale due to the switching of the switchover module, thereby significantly increasing the speed of the data transmission to the scale when reloading postage rate tables. As a result, the data center is not blocked (occupied) for an unnecessarily long time by the user (postage calculator/scale).

In one embodiment an internal switchover module for a modem is employed as the switchover module, in another embodiment an external switchover module for a modem is employed as the switchover module. An external modem switchover module can also be combined with a modem or with a postage calculator.

The loading ensues on demand and separated in time from the updating of the rate table data in the postage calculator. The transmission and storage of a new postage rate table in the postage calculator can be implemented on demand or automatically implemented in a pre-programmed manner at a first point in time. The updating of rate table data is automatically implemented at a second point in time. The postage calculator is arranged in the scale of the mail processing system. The scale contains a keyboard with a trigger key for the loading and a memory for storing postage rate tables.

DESCRIPTION OF THE PREFERRED EMBODIMENTS

Figure 1A:
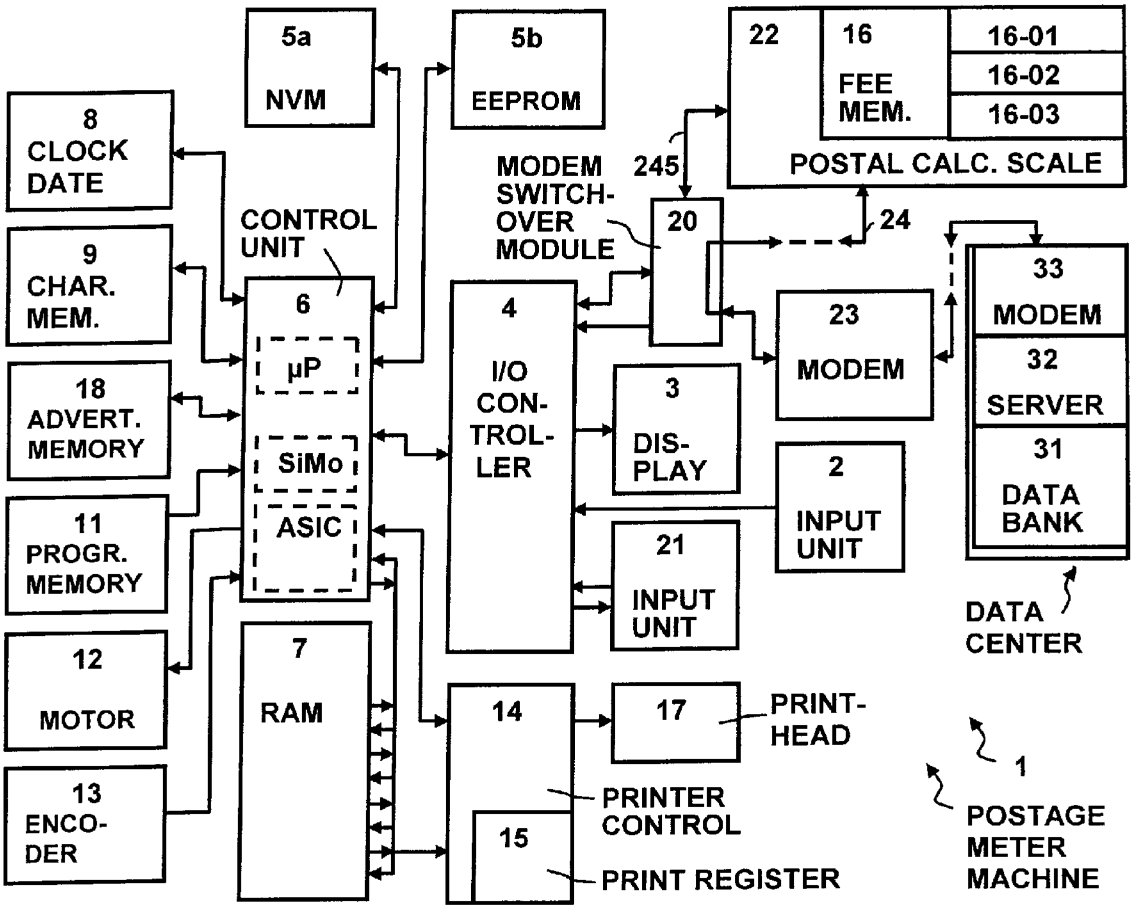
FIG. 1*a* is a block circuit diagram of a postage meter machine with connection to a postage-calculating scale, with which the inventive arrangement can be utilized.

FIG. 1*a* shows a block circuit diagram of a postage meter machine 1 having a connection to a postage-calculating scale 3 and having the inventive switchover module 20. The module 20 has connections to an external postage-calculating scale 22 and to a modem 23 that sets up the communication with a data center DZ. An input unit 2 and a display 3 and the module 20 are coupled via an input/output control module 4 to a control unit 6 that is connected to a volatile main memory 7 and to non-volatile memories 5*a*, 5*b*, 8, 9, 18 and 11. These memories are respectively provided for storing postal register data and other data, which include the variable parts (character memory 9) and constant parts (slogan memory 18) of the franking imprint and contain programs for the data processing in conjunction with the mail carrying or (program memory 11) service to be performed by the carrier. The character memory 9 supplies the required print data for the variable parts of the franking imprint to the volatile main memory 7. The memory 8 is a clock/date module, which may be battery supported.

The aforementioned components 2 through 9, 11 and 18 form the actual meter 1 that is fashioned to be removable from the base with its own housing, such as a postage meter machine of the JetMail® type. The base or postage meter machine 1 can contain the modem 23 and can have a further input unit 21, such as a chip card and read/write unit.

The postage meter machine also includes a print head 17 operated by a printer control 14 having a print register 15. Newer postage meter machines utilize digital printers such as, for example, ink jet printers in the postage meter machines of the JetMail® type or thermal transfer printers in postage meter machines of the type T1000. It is thus fundamentally possible to print other information on a filled envelope in the region of the franking stamp or to print different symbols, having a corresponding relationship to a service of a carrier. It is thus easily possible to change among private mail carriers and their services. The franking stamp imprint therefore advantageously contains a reference to the carrier and/or the service that is being made use of or that is planned. The control unit 6 is or includes a microprocessor μP that is in communication with the input/output control module 4, the character memory 9, the volatile main memory 7 and the non-volatile main memories 5*a*, 5*b*, a non-volatile main memory 18 and the program memory 11, as well as with the motor of a transport or feed mechanism, possibly with a tape dispenser 12, an encoder 13, which emits position signals from the feed mechanism as well a with the clock/date module 8. The memories 5*a*, 8, 9, 11, 18 can be realized in the form of individual components or combined in groups of separate components (battery-supported CMOS RAMs or EPROM). That memory module that includes the non-volatile main memory 5*b* can, for example, be an EEPROM that is protected against removal by at least one additional measure, for example by being glued to the printed circuit board, or by sealing or potting with epoxy resin. More details about individual functions of the means are provided in German Patent Application 195 34 530.

In addition to a microprocessor μP, the control unit 6 can also optionally contain an application-specific circuit ASIC for communication with sensors and actuators of the machine base (European Application 716 398), a security module SiMo (European Application 789 333) and other means, possibly for improving the data security (German OS 196 50 993).

The data center DZ has modems, such as modem 33, that are connected to a server 32 that accesses a data bank 31 when a corresponding request is received. Given actuation as needed of a key 45 of the keyboard 42 of the scale 22, (See FIG. 1*b*) the module 20 is switched via a control line 245 and the loading of the postage rate table data from the data center is initiated. The scale 22 can now directly use the modem 23 of the postage meter machine 10 for the communication with the data center when the modem 23 is connected via the modem switchover module 20 to the scale 22 with a cable 24, which is shown in FIG. 1*a*. The cable 24 has the aforementioned control line 245 and line 246.

A switchover ensues after the end of the loading, and the sale 22 has its serial interface RS 232 (see FIG. 1*b*) connected—in a way that is not shown—via the cable 24 via the modem switchover module 20 to a serial interface RS 232 (not shown in FIG. 1*a*) of the input/output control module 4. A rate memory 16 and a CPU 27 are component parts of the postage calculator of the postage-calculating scale 22, which can determine a weight of a piece of mail and calculate a valid postage value.

At the same time, the modem 23 is connected via the modem switchover module 20 to the input/output control module 4. Given actuation as needed of a key of the keyboard of the postage meter machine 1, the reloading of a credit from the data center DZ can now be initiated. The microprocessor μP (control unit 6) of the respective meter 1 thus can communicate request data via the modem 23 to the modem 33 of the data center DZ via a communication network. Alternatively, radio transmission/reception devices can be utilized and request data can be communicated by radio, or a digital communication network can be used.

Although, as a simplification only loading of postage rate tables is mentioned below, other service data are not excluded from the loading. Advantageously the communication from the data center DZ by modem can ensue directly with the control unit 6. When service data are needed, particularly a modified postage rate table, a method for secure transmission of service data to a terminal device can be utilized as disclosed in detail in German Application 198 30 055.7. After an offering of new service data in the data center DZ for a future processing based on the service data, request data for service data are formed by the meter 1 before the communication of the meter 1 with the data center DZ. The communication includes a sending the request in order to request the new service data from the data center, and reception and intermediate storage of the requested service data at the data center DZ.

The actuated trigger key 45 of the scale 22 can trigger a pre-loading of a table that will be valid in the future without updating the existing, second table of the same mail carrier. A date for when the table takes effect must be stored allocated to each table version. A check as to whether the table is to be placed into effect continues to ensue with a clock/date module 48 (which may be battery-supported) of the scale 22.

Differing from the mail processing system according to European Application 724 141, a long communication with a remote server with a conversion procedure during the communication every time the machine is turned on do not occur given the inventive system. On the contrary, the actuated trigger key 45 of the scale 22 can trigger "on demand" loading of the table that will be valid in the future at a first point in time, in advance of a second point in time for the actual updating/conversion event. The conversion event itself remains unnoticed by the user because it occurs automatically, decoupled from the "on demand" loading, on the conversion day and thereby sequences relatively fast.

Figure 1B:
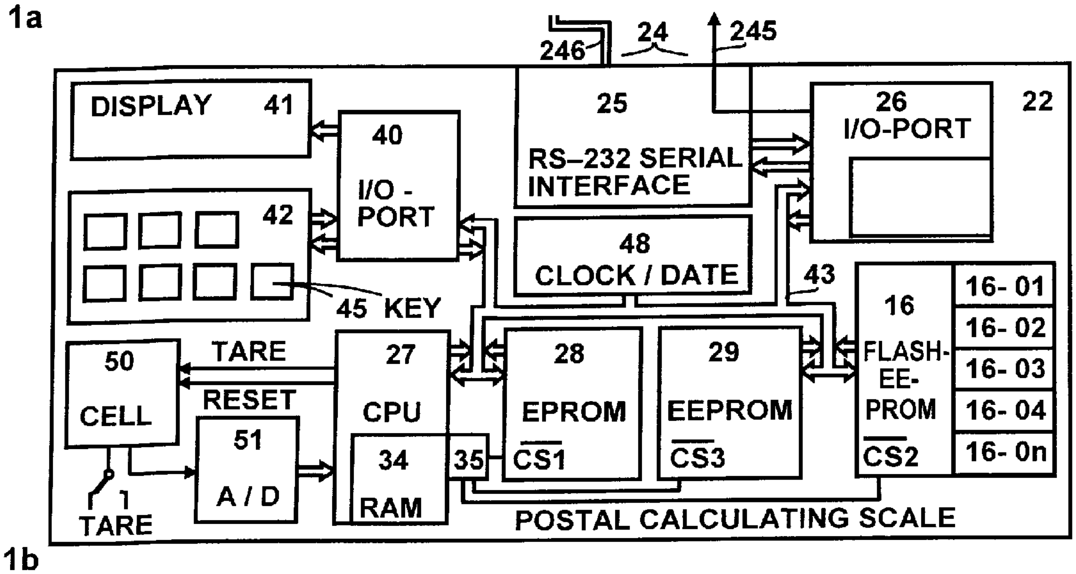
FIG. 1*b* is a block circuit diagram of a postage-calculating scale, with which the inventive arrangement can be utilized.

FIG. 1*b* shows a block circuit diagram of the postage-calculating scale 22 that is connected to the postage meter machine 1 via the aforementioned RS-232 serial interface, referenced 25. An input/output port 26 that is in communication with the CPU 27 of the scale 22 via an internal bus 43 is connected to the RS-232 interface 25 of the scale 22. Such a bus 43 includes data, address and control lines.

The aforementioned keyboard 42 and a display 41 are connected to the processor 27 via an I/O port 40 and, via the internal bus 43, to a memory 28 connected to the processor 27 for storing the operating software of the scale 22, a memory 29 for storing application data (for example, selective imprint numbers for endorsement) and a memory forming the rate table 16 for storing the loaded service data (for example, the postage tables). The compressed data are read into the internal RAM 34 of the processor 27 and are decompressed with the assistance of the operating software. For reading the zip-to-zone conversion table into the memory 29 (an EEPROM) for application data, the corresponding chip select line CS3 from the processor 27 is directly or indirectly activated via a connected switch 32. For determining the weight, a weighing cell 50 is connected to the processor 27 via and A/D converter, and, moreover, direct connections serve for resetting or taring the weighing cell 50 with the processor 27. A more detailed explanation of this operation is disclosed in U.S. Pat. No. 5,710,706 (European Application 724 141). The clock/date module 48 also is connected to the internal bus 43. All necessary inputs are undertaken via the keyboard 42. Important information such as, for example, the weight of the postal matter and the postage calculated on the basis of the postage rate table are shown on the display 41.

When a modified postage rate table is required in the electronic postage calculator, a loading can ensue on demand. To that end, the key 45 is actuated in order to trigger the loading event, and a corresponding display appears on the display 41. The driver 203 (see FIG. 2) of the modem switchover module 20 is correspondingly fashioned to react to a signal on the control line 245 ("modem enable") in order to undertake a switching. When the scale 22 is switched into the load mode, various service data and, in particular, the postage rate table that is to be entirely or partially modified can be loaded. Differing from the aforementioned solution of European Application 724 141, there is no coupling of the loading event with an updating, and the key 45 does not yet trigger an updating mode.

In normal operation the CPU 27 of the scale 22 accesses a second memory area 16-02, which contains the valid rate tables.

Loading of new rate table data ensues into a first area 16-01, and loading of an appertaining conversion date ensues into a third area 16-03. Optionally, loading of further information ensues into a fourth memory area 16-04, this information being related to a service of the carrier or of the data center DZ. The clock/date module 48 automatically communicates the currently valid date of the day to the postage calculator at least once, for example respectively upon initial turn-on at the start of the day. The communicated data are compared in the postage calculator to the aforementioned conversion date. The automatic updating is suppressed when the date of the day is lower than the conversion date. The automatic updating is undertaken when the date of the day is higher than or equal to the conversion date.

The CPU 27 is programmed to check the stored conversion date relative to the current date and to continue operating with the old rate table data when the current date falls short of the conversion date and to communicate an instruction to the postage calculator for updating the rate table data when the current date is the same as or beyond the conversion date. The postage calculator writes data for updating the rate table data in the memory 16.

The invention provides that the postage calculator in the scale 22 undertakes a selective erasing of memory areas in the scale 22 before the loading of compressed, new rate table data. At a second point in time, the postage calculator then implements an updating of the rate table data, possibly connected with a decompression of the loaded, new rate table data and a write-in of the decompressed data, the rate table data from the first memory area being decompressed and stored in the second memory area 16-02 of the scale. This makes it possible for the automatic updating to ensue at an arbitrarily later conversion date, decoupled in time from the aforementioned loading.

In one version that an automatic unit forms request data for loading at a first point in time defined by the user, in order to update the loaded postage rate table data when the second point in time defined by the mail carrier for new postage rate table data has approached, in order to be able to access current tables. This automatic unit operates dependent on the mail carrier that has been selected (carrier ID), on the version number or on the order number, or using load codes and the information supplied by the clock/date module 48. The automatic unit has an operative connection to a microprocessor and to the keyboard 42 can be realized in the postage calculator itself and/or in the memory cells of the clock/date module 48.

Figure 2:
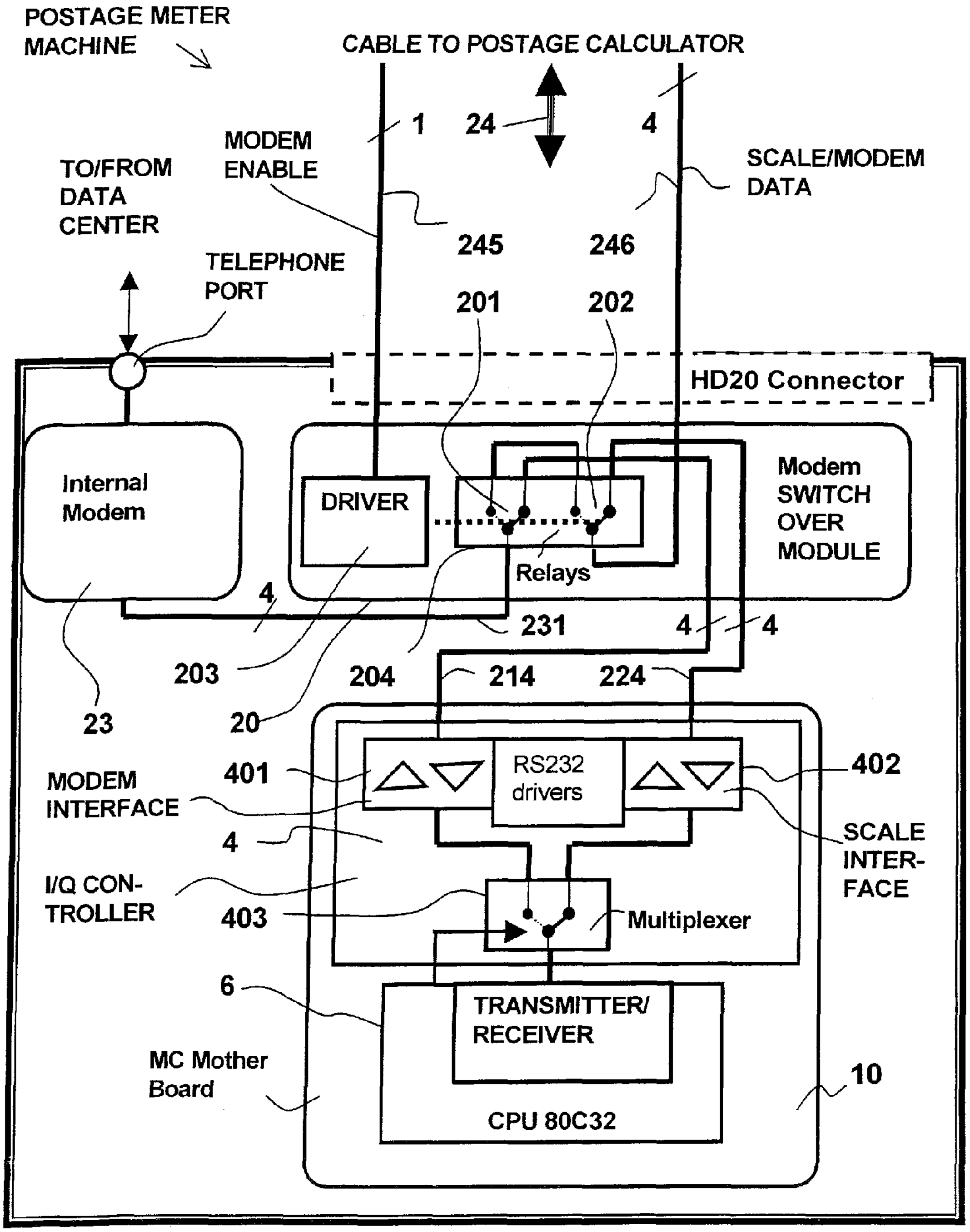
FIG. 2 is a block circuit diagram of an internal modem switchover module for use in a postage meter machine in accordance with the invention.

FIG. 2 shows a block circuit diagram detail with an internal modem switchover module 20 for use in a postage meter machine FM to which a scale (not shown) with postage calculator can be coupled. The aforementioned cable 24 for connection of the postage meter machine to the scale is connected to the modem switchover module 20 with an HD20 connector, for example. The connector is preferably arranged within the postage meter machine. A micro-computer control board 10 of the postage meter machine is equipped with a modem interface 401, which includes corresponding drivers, and with a scale interface 402, which includes corresponding drivers, and includes the microprocessor (control unit 6) whose transmitter/receiver port is connected to an input of a multiplexer 403 of the input/output control module 4.

During normal operation, the multiplexer 403 is switched such that the drivers of the scale interface 402 are connected via the modem switchover module 20 to the RS-232 interface of the scale 22. When a reloading of a credit is required, the microprocessor switches the multiplexer 403 onto the drivers of the modem interface 401, which are then connected via the modem switchover module 20 to the modem 23. When a download of a postage rate table is required, the microprocessor 27 of the scale 22 switches the modem switchover module 20, as has already described on the basis of FIG. 1*a*. The microprocessor 27 of the scale 22 has an I/O port 26 from which the "modem enable" control line 245 leads via the RS-232 interface 25 of the scale to a driver 203 of the modem switchover module 20 for the purpose of switching it. After the switchover, the communication with a transmission of the scale/modem data on the lines 246 leads via the cable 24. These lines 246 include, for example, a TXD transmission line, an RXD reception line, a DTR reception readiness line and a DSR transmission readiness line. Via the contact group 201 or 202 of the relay and via four lines 231, the modem is directly connected to the RS-232 interface 25 of the scale 22 with the postage calculator.

The drivers 401, 402 and the multiplexer 403 are correspondingly fashioned such that a group having the aforementioned four lines, via the drivers 401 and lines 214, as well as via the drivers 402 and lines 224, are respectively connected to the contact groups 201 and 202 of the relay 204 of the modem switchover module 20. The contact group 201 or 202 is connected to the interface of a postage calculator. When loading rate tables, the aforementioned circuit parts are disconnected due to the switching of the switchover assembly 20.

Figure 3:
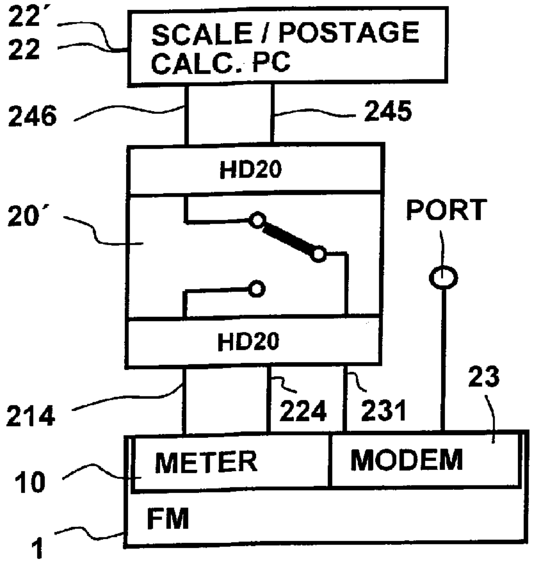
FIG. 3 is a block circuit diagram with an external switchover module in accordance with the invention.

In a version with an external modem switchover module 20' shown in FIG. 3, the postage meter machine 1 has an internal modem 23. The modem switchover module 20' has two HD20 connectors. In a way that is not shown, one thereof is connected to a connector of the RS-232 interface 25 of the postage-calculating scale, and the other is connected via the HD20 connector of the postage meter machine to the lines 214, 224 and 231. The reference characters in the block circuit diagram with the postage meter machine-infernal modem 23 and external switchover module 20' are selected according to FIG. 2. The MC control board 10 of FIG. 2 is merely referred to here as a meter 10.

Figure 4:
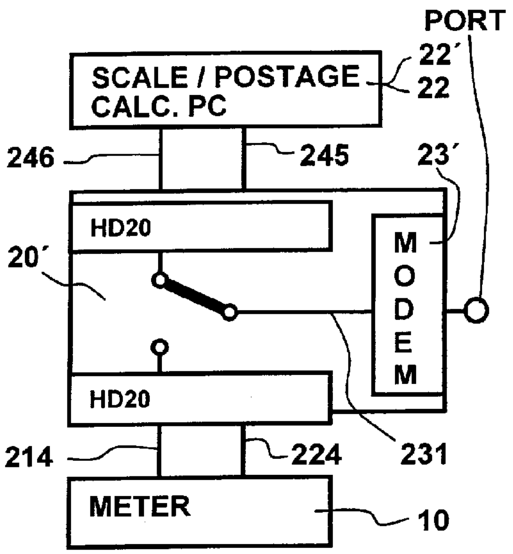
FIG. 4 is a block circuit diagram with an external modem switchover module in accordance with the invention.

An external switchover module 20' can also be combined with an external modem 10', as fundamentally proceeds from FIG. 4. For example, a docking station for the removable meter of the postage meter machine JetMail® can be equipped with the external modem 23' and the switchover module 20'. Optionally, a postage calculator 22 or a meter 10 then can be coupled to the docking station in order to load rate table data or credit data into the meter 10. In this example, the postage calculator is a component part of the scale 22.

However, it is not precluded for the postage calculator 22' to be realized in the system separately from the postage meter machine and/or scale and is connected to the latter by interface. Such an arrangement has been disclosed in German Application German OS 196 22 304. Such an external postage calculating module 22' can be advantageously combined with an external modem switchover module 20'.

Figure 5A:
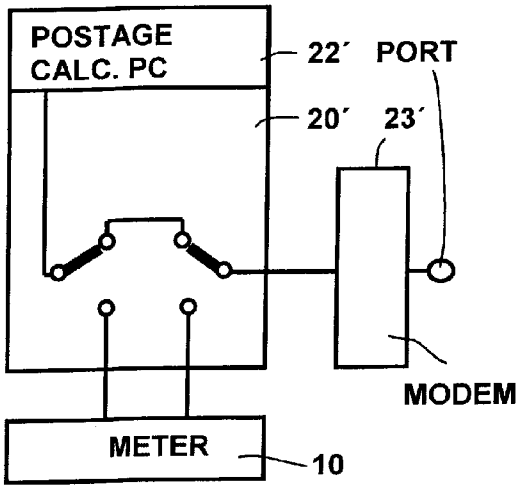
FIG. 5*a* is a block circuit diagram with an external postage PC and switchover module in the switch status of loading rate tables in accordance with the invention.

The block circuit diagram according to FIG. 5*a* shows an external postage PC and switchover module 20', 22' in the switched condition of loading rate tables. In the latter instance, the modem 23' is connected to a postage PC 22'. The postage PC 22' can switch the switchover module 20' into the aforementioned switched condition of loading rate tables or into the other switched condition of reloading postage credit.

Figure 5B:
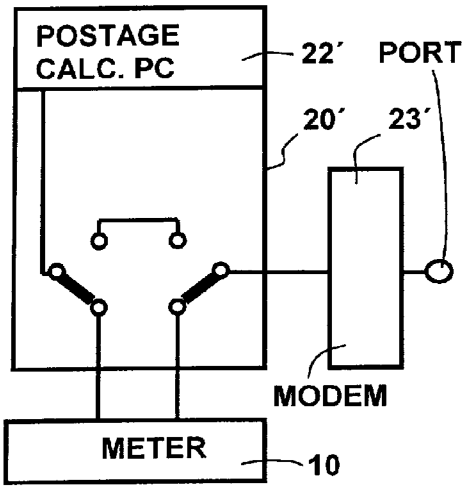
FIG. 5*b* is a block circuit diagram with an external postage PC and switchover module in the switch status of reloading postage credit.

FIG. 5*b* shows a block circuit diagram with external postage PC and switchover assembly in the switched condition of reloading postage credit. In this case, the modem 23' is connected to the meter 10 in order to enable a reloading of postage credit as needed. Further, the meter 10 is connected to the postage PC 22' which in turn has an interface (not shown) to a scale. Given such a system, a respective postage calculator (postage PC) can be allocated to a specific mail carrier. The components of the switchover module (20, 20') can be electromechanically fashioned as relays or fully electronically as multiplexers.

Although modifications and changes may be suggested by those skilled in the art, it is the intention of the inventor to embody within the patent warranted hereon all changes and modifications as reasonably and properly come within the scope of his contribution to the art.

I claim as my invention:

1. An arrangement for loading rate table data comprising:

an external scale having a postage calculator requiring rate table data to calculate a monetary postage value for a postal item weighed by said scale;

a postage meter that prints said monetary postage value on said postal item, said postage meter having a processor therein;

a serially-operating modem which receives said rate table data from an external source other than said postage meter; and a switchover module connected between said potage meter, said scale and said modem, said switchover module being configured, upon receiving a control signal from the postage calculator via a control line, to be switched from among a plurality of switching states of said switchover module to a serial connection state to thereby produce a serial connection between said external source and said postage calculator in said scale to serially conduct data downloading of said rate table data from said external source to said postage calculator in said scale via said modem and said switchover module with no internal processing or storage of said rate table data by said processor of said postage meter.

2. An arrangement as claimed in claim 1 comprising a postage meter machine containing said postage meter, and wherein said switchover module is contained within said postage meter machine.

3. An arrangement as claimed in claim 2 wherein said postage meter machine comprises an input/output control module containing a modem interface and a scale interface, and wherein said postage calculator comprises a postage calculator interface, said switchover module being connected between said modem interface, said scale interface and said postage calculator interface and said scale comprising means for supplying a signal on said control line to switch said switchover module to a switching state wherein said postage calculator, via said postage calculator interface, directly receives said rate table data.

4. An arrangement as claimed in claim 3 wherein said switchover module comprises a first contact group connected to said modem, and connected to said modem interface via a first set of four lines, a second contact group connected to said postage calculator interface and to said scale interface via a second set of four lines, and a driver connected to said control line for operating said first and second contact groups to set said switching state of said switchover module dependent on a signal on said control line.

5. An arrangement as claimed in claim 4 wherein said postage calculator interface comprises an RS-232 interface, and wherein each of said first and second sets of four lines comprises a TXD transmission line, an RXD reception line, a DTR reception readiness line, and a DSR transmission readiness line.

6. An arrangement as claimed in claim 4 wherein said control line is also connected to said postage calculator interface, which supplies said signal on said control line to set said switching state of said switchover module.

7. An arrangement as claimed in claim 6 wherein said scale comprises a keyboard having an actuatable selection key, said keyboard being at least indirectly connected to said postage calculator interface and actuation of said selection key causing said signal to be generated on said control line for setting said switching state of said switching module to cause said rate table data to be directly supplied to said postage calculator.

8. An arrangement as claimed in claim 7 wherein said postage calculator operates with existing rate table data and wherein said rate table data from said external source comprise updated rate table data, and wherein said postage calculator includes a first memory area wherein said existing rate table data are stored and a second memory area wherein said updated rate table data are stored after actuation of said selection key, said updated rate table data including conversion data identifying an effective date of the updated rate table data, and said postage calculator having a third memory area in which said conversion data are stored, and said postage calculator automatically replacing said existing rate table data with said updated rate table data at a time of first use of said postage calculator following said effective date.

9. An arrangement as claimed in claim 8 wherein said updated rate table data further include data representing additional information, and wherein said postage calculator has a fourth memory area for storing said data representing additional information.

10. An arrangement as claimed in claim 8 wherein said scale comprises a clock/date module connected to said postage calculator, and wherein said postage calculator is programmed to automatically compare a date supplied by said clock/date module with said conversion data and to replace said existing rate table data with said updated rate table data when said conversion data equal or follow said date supplied by said clock/date module.

11. An arrangement as claimed in claim 1 comprising a postage meter machine containing said postage meter, and wherein said modem switchover module is disposed externally of said postage meter machine.

12. An arrangement as claimed in claim 11 wherein said scale with said postage calculating module is external from said postage meter machine.

13. An arrangement as claimed in claim 11 wherein said switchover module and said external modem are combined to form a docking station.

14. An arrangement as claimed in claim 11 wherein said switchover module in said postage calculator are combined in a common housing and are both disposed externally from said postage meter machine.

* * * * *